(12) United States Patent
Kaminski et al.

(10) Patent No.: US 8,245,008 B2
(45) Date of Patent: Aug. 14, 2012

(54) SYSTEM AND METHOD FOR NUMA-AWARE HEAP MEMORY MANAGEMENT

(75) Inventors: Patryk Kaminski, Austin, TX (US); Keith Lowery, Bothell, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 669 days.

(21) Appl. No.: 12/372,839

(22) Filed: Feb. 18, 2009

(65) Prior Publication Data
US 2010/0211756 A1 Aug. 19, 2010

(51) Int. Cl.
*G06F 13/14* (2006.01)
(52) U.S. Cl. .................. 711/172; 711/171; 711/E12.001
(58) Field of Classification Search .................... 711/172
See application file for complete search history.

(56) References Cited

U.S. PATENT DOCUMENTS

| | | | |
|---|---|---|---|
| 7,181,585 B2 | 2/2007 | Abrashkevich | |
| 7,434,020 B2 | 10/2008 | Swafford | |
| 7,574,567 B2 | 8/2009 | Wyman | |
| 7,827,373 B2 | 11/2010 | Kaakani | |
| 7,962,707 B2 | 6/2011 | Kaakani | |
| 8,042,114 B2 | 10/2011 | Chung | |
| 2004/0205304 A1* | 10/2004 | McKenney et al. | 711/148 |

* cited by examiner

*Primary Examiner* — Kenneth Lo
(74) *Attorney, Agent, or Firm* — Meyertons, Hood, Kivlin, Kowert & Goetzel, P.C.

(57) ABSTRACT

A system and method for allocating memory to multi-threaded programs on a Non-Uniform Memory Access (NUMA) computer system using a NUMA-aware memory heap manager is disclosed. In embodiments, a NUMA-aware memory heap manager may attempt to maximize the locality of memory allocations in a NUMA system by allocating memory blocks that are near, or on the same node, as the thread that requested the memory allocation. A heap manager may keep track of each memory block's location and satisfy allocation requests by determining an allocation node dependent, at least in part, on its locality to that of the requesting thread. When possible, a heap manger may attempt to allocate memory on the same node as the requesting thread. The heap manager may be non-application-specific, may employ multiple levels of free block caching, and/or may employ various listings that associate given memory blocks with each NUMA node.

19 Claims, 8 Drawing Sheets

SYSTEM AND METHOD FOR NUMA-AWARE HEAP MEMORY MANAGEMENT

BACKGROUND OF THE INVENTION

1. Field of the Invention

This invention relates generally to memory management on multi-processor computer systems and, more specifically, to a system and method for efficient memory heap management in Non-Uniform Memory Access systems.

2. Description of the Related Art

Writing software for multi-processor systems is not an easy task. In an ideal scenario, as the total number of processors increase in a system, the throughput of an application would also scale proportionally. However, this is rarely the case in practice. Thread synchronization and accessing shared resources can cause portions of a program to execute serially, and possibly produce bottlenecks. For example, when multiple processors use the same bus to access the memory, the bus can become saturated. As the number of processors in the system increases, the available memory bandwidth to each processor decreases. Ideally, doubling the number of processors should double the performance, but this is almost never the case. In fact, in many scenarios, increasing the number of processors in the system may cause performance degradation.

Some traditional systems are based on a Uniform Memory Access (UMA) shared memory architecture, such as the common bus-based symmetric multiprocessing (SMP) systems where multiple processors access the memory via a shared bus. The memory access time for any processor is the same but the shared memory bus can become a major performance bottleneck. Processor manufacturers have traditionally attempted to mitigate the bottleneck by increasing processor cache sizes. Large caches increase the chance that the processor will find the data it needs in the local cache and may not have to access memory at all. Unfortunately, a large data cache may not be a general solution to the memory bottleneck problem as some memory intensive applications may use large areas of memory that do not fit in the available cache. In such cases the memory bottleneck difficulties remain. Further, the problem may worsen as the number of processors connected to the shared bus increases.

Another approach for reducing the shared memory bus bottleneck is through the use of Non-Uniform Memory Access (NUMA) system architecture. In the NUMA architecture, node may comprise a processor coupled to local memory. There may also be a mechanism allowing one processor to access memory connected to another processor. Typically a processor may access its local memory (i.e., memory connected directly to the processor) faster than it may access remote memory (i.e., memory connected to another processor, on another node). An important challenge with NUMA architectures is controlling where the memory for data and code is allocated. However, carefully managing memory is an added burden for programmers. Implementing well-performing software solutions can be a very challenging task for a number of technical reasons, which is why many real-world software application developers often choose to ignore the problem.

Operating systems (OSs) provide multiple application programming interfaces (APIs) for memory allocation and management. Unfortunately, these APIs are not always very efficient. In general, making an OS API call is expensive because of the context switch between user mode and the system kernel. Further, the APIs often have limitations such as large minimum allocation size. For example an API function may always allocate a whole page (4 KB) of memory even if the caller requested a much smaller size. This poses a serious problem for applications that frequently allocate and release small memory blocks.

To solve these problems, programmers typically use heap memory manager libraries. The standard C/C++ libraries for most popular C/C++ compilers include such heap manager implementations, but there are also many other 3rd party options. A typical heap memory manager uses the OS API to allocate large memory blocks at a time and divides these blocks into smaller parts to satisfy memory requests by the calling program. This reduces the cost of API call overhead. For example, an application may make 1000 calls to allocate 64 bytes of data, but the heap manager may make only a single OS API call to allocate a large memory block (e.g., 1 MB), and carve out 64 bytes of memory for each 64 byte request. When the initial pool of 1 MB of memory is used up, the heap manager may typically make another OS API call to allocate more memory. The heap memory manager can also allow applications to allocate memory blocks of smaller size, which may help reduce the waste of memory due to fragmentation.

Modern operating systems use virtual memory and give applications limited control over the mapping of virtual to physical memory. In such systems, when an application allocates a memory block (using an OS API call or a heap memory manager), it is assigned a virtual memory region. The OS maps that virtual memory region to a physical memory location, but the OS typically retains a full control over when that happens or what physical memory range to use.

Modern operating systems such as Microsoft Windows and Linux use a "first touch" policy. This means that when an application or heap manager requests memory, the virtual address is initially not mapped to any physical memory. When a program thread first accesses the memory (read or write), the OS allocates a physical memory region and maps the virtual address to a physical range. The OS typically allocates physical memory from the NUMA node that is executing the thread which first accessed the virtual memory block. There are additional tools to help programmers better control the memory allocations and thread execution on NUMA systems. For example Microsoft Windows Vista™ provides an API that allows an application to allocate memory on a given node.

Unfortunately, both approaches have limitations that can adversely affect performance. Using these operating system APIs means that the programmer cannot use, and will lose, the benefits of heap memory managers provided in the C Runtime libraries (CRT), which may result in a high cost for memory allocation/management and potentially high memory fragmentation. Conversely, using a traditional heap memory manager, the programmer may not be able to control the location of memory allocations, resulting in degraded application performance due to a high volume of remote memory accesses.

SUMMARY

In embodiments, a NUMA-aware heap memory manager may attempt to maximize the locality of memory allocations in a NUMA system by tracking each memory block's location (i.e., node). The NUMA-aware heap memory manager may receive a memory allocation request from a thread for a block allocation of a given size. In response to receiving such a request, the heap manager may determine an allocation node of the NUMA system from which to allocate the memory to the thread. In some embodiments, the selection of an allocation node may be dependent, at least in part, on the locality of the allocation node with respect to the requesting thread. In some embodiments, the heap manager may attempt to choose an allocation node whose memory is as local to the requesting thread as possible. For example, a NUMA-aware heap memory manager may attempt to first find a memory block that resides on the same node as the requesting thread (i.e., select the thread's execution node as the allocation node).

Once the heap manager selects an allocation node, it may locate a memory block of the given size on the allocation node and allocate the block to the requesting thread.

In various embodiments, a NUMA-aware heap manager may track the location of each memory block using one or more listings of blocks. Each such listing may be associated with at least one NUMA node and one or more free blocks on the associated node. In such embodiments, locating a memory block on the allocation node may comprise checking one or more listings associated with the allocation node. In various embodiments, the listings may be configured into multiple cache levels. For example, in one embodiment, each thread may be associated with a local thread cache listing that may identify free memory blocks that are local to the thread. In some embodiments, each node may be associated with one or more free block listings (e.g., a central cache). In such embodiments, if a satisfactory block cannot be found in a local thread cache, then the heap manager may attempt to locate a satisfactory free memory block in one or more listings in a central cache. Various embodiments may have more or fewer levels of cache.

In some embodiments, if the heap manager cannot locate a free memory block to allocate to the thread, it may determine a different allocation node. Alternatively, a heap manager may send a request to the operating system for more memory and associate the newly allocated memory with the node on which the thread is executing. In various embodiments, a heap manager may leverage various decision-making mechanisms and/or heuristics in order to determine if it should request more memory from the operating system or choose a new allocation node. For example, in one embodiment, if the heap manager determines that the thread's local node does not have sufficient memory available for further allocation, it may decide to allocate memory to the thread from a different allocation node.

In some embodiments, wherein operating system support is available, a heap memory manager may specify the allocation node when requesting more memory from the operating system. In other embodiments, wherein the operating system implements a first touch policy, the heap manager may assume that the memory it requests is allocated on the allocation node. In such embodiments, when the memory block is released by the thread, a heap manager may determine if the memory block is associated with the same node as that which is executing the releasing thread (i.e., execution node). If it is not, then a heap manager may associate the released block with a common node instead of with the execution node. In such embodiments, a heap manager may associate with a common node, memory blocks whose location it cannot determine or has not determined.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF THE EMBODIMENTS

In Non-Uniform Memory Access multi-processor systems, such as the AMD Opteron™ multiprocessor system, each processor may have its own memory. The processors may also have direct links (e.g., HyperTransport™ bus) to each other, which may allow one processor to transparently access memory connected to another processor. In various such systems, hardware and/or software support may be provided in order to ensure data cache coherency among the various processors. Such systems are normally referred to as cache-coherent NUMA, or ccNUMA. As used herein, the term NUMA may refer to either traditional NUMA or ccNUMA machines.

In the NUMA architecture memory access times (e.g., latency, bandwidth, etc.) may not be consistent across memory banks. For example, an application thread executing on a given NUMA node may be able to access the node's local memory much more quickly than it can access memory connected to another, remote processor on a remote node. The node's local memory may be said to have more "locality" with respect to the node and/or with respect to the thread than does a remote node's memory.

Figure 1:
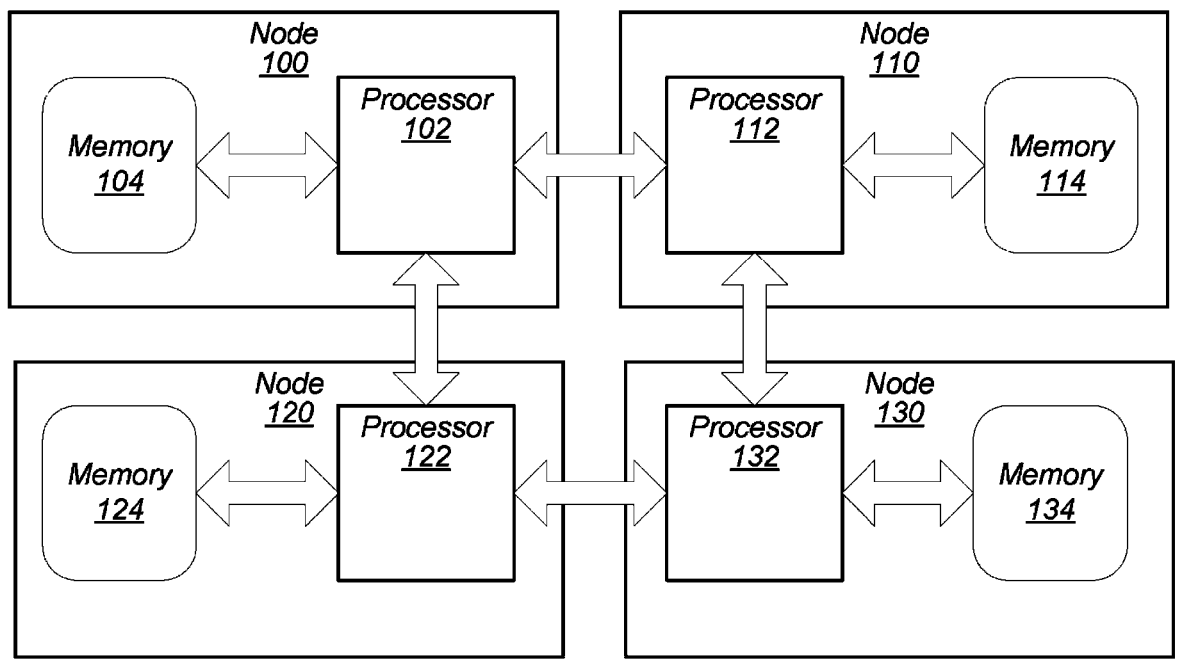
FIG. 1 is a block diagram of a prior art NUMA computer system.

Furthermore, depending on the structure of the links between processors, access to the memory of various remote nodes may also be non-uniform. For example, FIG. 1 illustrates a schematic diagram of a typical NUMA computer system. A program thread executing on processor 102 of node 100 may access node 100's local memory 104 relatively quickly. In order to access a block of memory in a less local memory, such as memory 114, the thread may send and receive data across a link to processor 112 on node 110. Doing so may be slower than accessing a block in local memory 104 because memory bank 114 has less locality with respect to processor 102 than does memory 104.

Furthermore, the thread may be able to access memory 114 more quickly than it is able to access memory 134 on node 130. This is because, in order to access memory 134, which is local to processor 132 on node 130, the request and data may be communicated across two links (i.e., between node 100 and node 110 and between node 110 and node 130). In this case, node 110 (and its components, processor 112 and memory 114) has more locality with respect to node 100 and its components, than does node 130 and its components. The number links separating one node from another node may be a measure of locality, as may the expected relative memory latency, memory bandwidth, or any combination thereof.

One of the main advantages of the NUMA architecture is that it may provide better scalability for systems with large number of processors than do traditional UMA architectures. However, the increased cost of accessing remote memory over local memory can degrade performance.

As explained above, ensuring optimal performance on a NUMA system is a difficult task and may not be achieved by the operating system alone. The "first-touch" policy of some operating systems may improve the probability that a program thread is assigned physical memory from the NUMA node executing it (i.e., the local node). However, using traditional techniques, if a thread releases the memory to the heap memory manager, which then re-allocates the memory to a different thread, it is likely that the new thread will be assigned memory that has already been committed to physical memory from a remote NUMA node. This is because traditional heap memory managers are not NUMA-aware; they do not keep track of memory locality and can interfere with operating system efforts to assign local physical memory to each thread.

In various embodiments, a NUMA-aware heap memory manager may be used to optimize the performance of multi-threaded applications on NUMA systems by increasing memory access locality among nodes. A NUMA-aware heap memory manager may keep track of the node on which each memory block resides in order to maximize locality in memory allocations, thereby improving system performance.

In some embodiments, a NUMA-aware heap memory manager may be provided as a general-purpose memory management library. In such embodiments, a traditional heap memory management library, such as the standard CRT heap memory manager or the TCMalloc heap memory management library, may be augmented to become NUMA-aware. In embodiments, a NUMA-aware heap memory management library may be provided as a general-purpose (i.e., not application-specific) library. As used herein, an application-specific heap memory management library or heap memory manager may refer to a software library written specifically for use with a given application implementation. Application-specific heap memory managers may leverage specific knowledge of the internal structure of the given application, such as the number of threads and/or the memory usage patterns of one or more threads. Application-specific heap memory managers may not normally be used with arbitrary applications without modification to the manager and/or the applications. In contrast, embodiments of a NUMA-aware heap memory management library that is not application specific, may be general-purpose and used by arbitrary software applications without modification to the application's source code or to the heap manager.

In embodiments, a NUMA-aware heap memory manager may expose an API that software programs may invoke in order to perform various memory management functions. The API may comprise one or more of the memory management functions defined by one or more programming language standards. For example, a NUMA-aware heap memory manager may provide the entire suite of memory management calls defined in the C standard (e.g., malloc, free, realloc, calloc, etc.) and/or the C++ standard (e.g., new, delete). In such embodiments, software that was written to access the memory management functions of a given standard library may be recompiled to use a NUMA-aware heap manager without modification to the source code or to the heap manager. In other embodiments, the object code of an application may simply be linked to the NUMA-aware heap manager at runtime without the need for recompilation or access to the application source code. For example, a C/C++ compliant heap memory manager, such as TCMalloc, may be augmented to be NUMA-aware, according to various embodiments. Because such a heap memory manager may expose the entire suite of memory management calls defined by the C standard, a C program that was written to invoke standard memory management routines may be linked to the NUMA-aware heap memory management library at runtime, according to normal C/C++ linking conventions. In this example, each call of the software application to a memory management function may invoke the corresponding functions of the NUMA-aware heap memory manager rather than those of the NUMA-unaware standard libraries. In such embodiments, the source code of the application need not be available and recompilation may be unnecessary.

Figure 2:
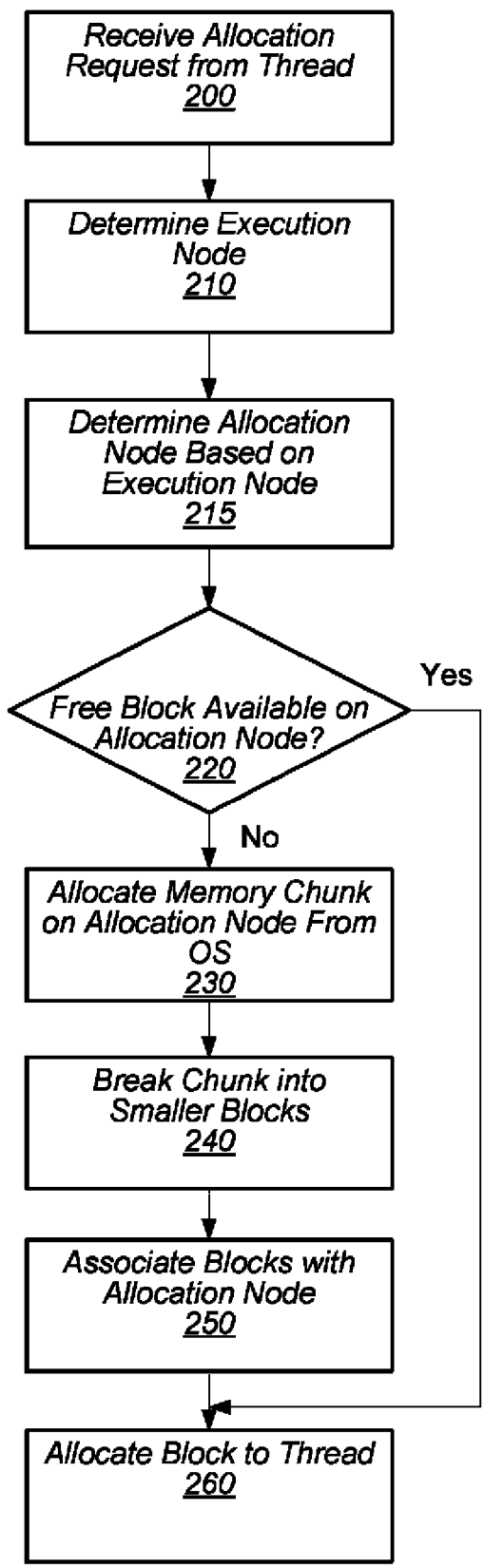
FIG. 2 is a flowchart illustrating a method for NUMA-aware heap memory manager allocating a block of memory to a thread, according to one embodiment.

FIG. 2 illustrates a method for allocating memory using a NUMA-aware heap memory manager, according to some embodiments. The method may be executed by a NUMA-aware heap memory manager and begin when the manager receives a request from a program thread for a new memory allocation, as in 200. The request for memory allocation may contain one or more parameters, such as the size of the allocation and/or the node on which the thread is executing (i.e., the execution node). For example, a thread may request that a 32-byte block of memory be allocated to it.

In response to receiving an allocation request, as in 200, the NUMA-aware heap memory manager may determine the NUMA node on which the thread is executing, as in 210. The NUMA-aware heap memory manager may then determine, as in 215, an allocation node, based at least in part on the identity of the execution node determined in 210. In various embodiments, in order to minimize slow inter-node memory accesses, the NUMA-aware heap memory manager may aim to allocate a memory block from an allocation node that is optimally local to the thread (i.e., the execution node). For example, in one embodiment, the heap manager may determine that memory is available on the execution node and allocate one or more blocks from the execution node. That is, the heap manager may choose the execution node as the allocation node.

In some embodiments, the heap manager may determine that the memory block cannot or should not be allocated from the execution node under certain circumstances. Such a decision may be made if the heap manager determines that allocation on the execution node is undesirable or impossible due to one or more exceptional factors, such as the level of free memory on the execution node dropping below a given level. In such embodiments, the decision may be based on various criteria, such as a determination that the application may be allocating too much memory from the operating system, which can result in other components running out of memory.

If such a determination is made, the heap manager may choose an allocation node that is relatively "close" to the execution node. That is, in 215, the heap manager may choose an allocation node with a relatively low latency and/or high bandwidth link to the execution node, based on the identity of the execution node determined in 210.

In the method of FIG. 2, once the heap manager determines the identity of the allocation node, as in 215, the heap manager may determine if a free block is available on that node, wherein the block matches the given criteria, as in 220. If the heap manager does not have any memory block that matches the request, as in the negative exit from 220, the heap manager may request that a larger chunk of memory be allocated to it by the operating system on the allocation node, as in 230. In alternate embodiments, the heap manager may respond by determining a different allocation node.

Memory chunks allocated by the operating system may span multiple memory pages and may be referred to herein as "page spans". In some embodiments, the operating system may allocate memory in page units. In various embodiments, the size of the memory chunk that the heap manager requests from the operating system may be of different sizes. For example, the heap manager may request from the operating system a chunk of a standard size for each allocation, such as 1 MB. In other embodiments, the heap manager may tailor the requested chunk size based on one or more factors. For example, in one embodiment, if the heap manager detects that a given node is consuming memory quickly, it may request a relatively larger memory chunk from the operating system.

In the illustrated embodiment, once a memory chunk has been allocated from the operating system to the heap manager, the heap manager may break up the chunk into smaller blocks of various sizes, as in 240, and associate the blocks with the allocation node, as in 250. In various embodiments, the blocks may be associated with the node in various configurations. For example, in one embodiment, each block may be identified on a list associated with the node. In other embodiments, multiple lists may be associated with each node. For example, each list may identify blocks of a given size. In further embodiments, multiple lists may serve as different levels of memory cache. In various embodiments, a heap manager may track where various memory blocks have been allocated by using any combination of lists, sets, bags, or other collection structures.

In embodiments, once one or more memory blocks have been associated with the allocation node, as in 250, they may be available for satisfying future allocation requests from threads on the execution node, as demonstrated by the affirmative exit from 220. In the pictured embodiment, once a memory block that meets the requested criteria has been located, either via the affirmative exit from 220 or the memory allocation process of 230-250, the block may be allocated to the requesting thread, as in 260.

Figure 3A:
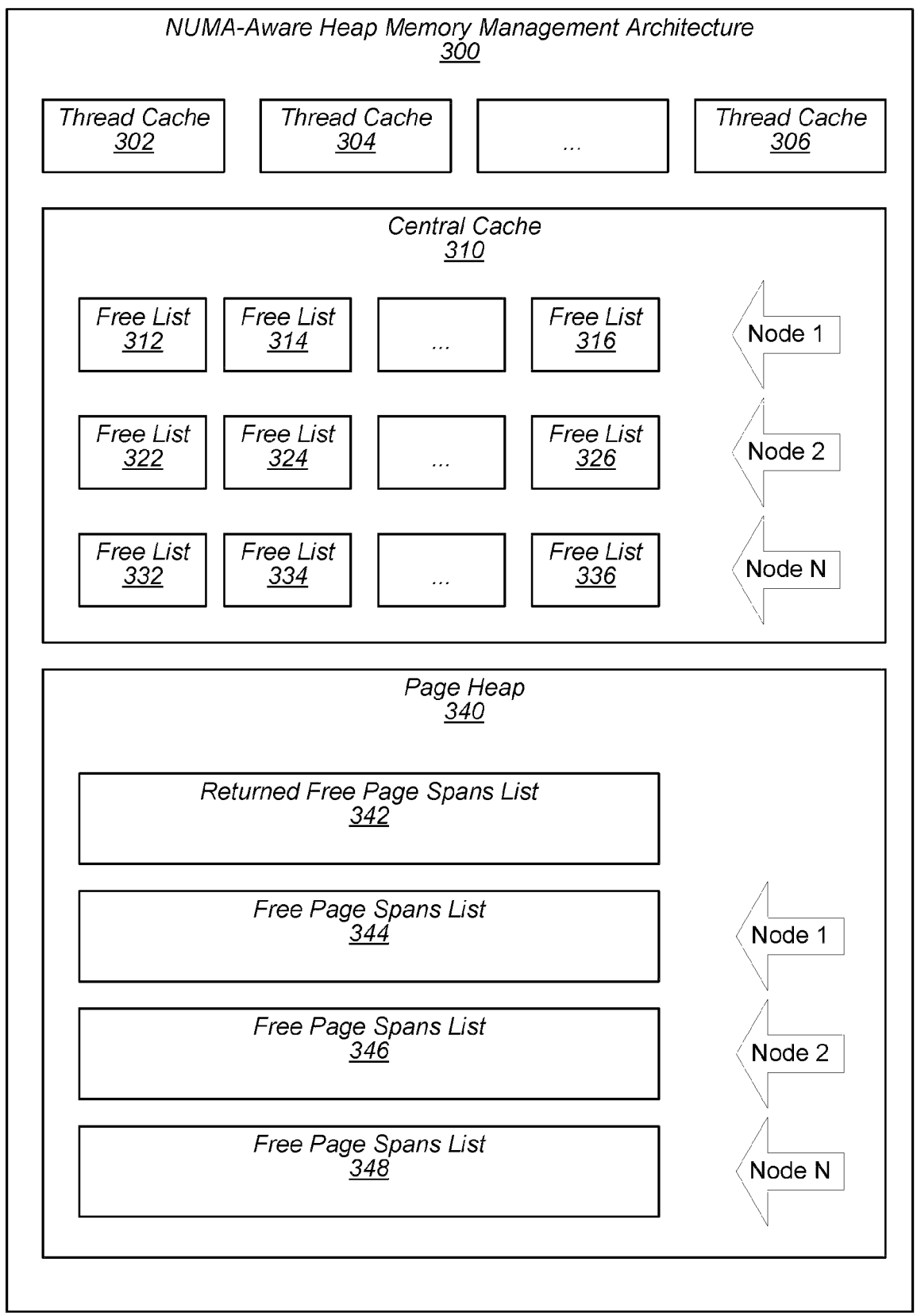
FIG. 3a is a block diagram of a NUMA-aware heap memory management architecture, according to one embodiment.

FIG. 3a is a schematic diagram illustrating one embodiment of a NUMA-aware heap memory management architecture. In the illustrated embodiment, NUMA-aware heap memory management architecture 300 (i.e., heap manager) uses three levels of memory block caching to track the allocation of memory blocks and improve system performance. These levels are local thread caches 302-306, central cache 310, and page heap 340. In other embodiments, a heap memory manager may have more or fewer levels of caching. In the illustrated embodiment, NUMA-aware heap memory management architecture 300 may associate each thread with a unique local thread cache, such as 302, 304, or 306. Each such thread cache may identify one or more free memory blocks on the thread's execution node. These identified blocks may be allocated from the heap manager to the associated thread. In some embodiments, a local thread cache (e.g., 302, 304, or 306) may identify memory blocks that do not exceed a maximum size. For example, in one embodiment, if a thread requests that a memory block of 32 KB or smaller be allocated to it, then the heap manager may attempt to locate an appropriate block of memory in the local thread cache corresponding to the thread.

In embodiments that utilize one or more local thread caches, local thread caches may reduce the level of lock contention among multiple concurrent threads. In multi-threaded environments, multiple threads may request to allocate or release memory from the heap manager at the same time. In some embodiments, a heap manager implementation may employ one or more thread synchronization mechanisms, such as locking or transactional memory, to ensure correct program behavior and avoid memory corruption. However, since each local thread cache is relevant to only one thread, in various embodiments, these caches may not create serialization bottlenecks. In some embodiments, synchronization mechanisms may not be applied to local thread caches.

The next level of cache in the illustrated embodiment of FIG. 3a is central cache 310. Heap manager 300 may keep memory blocks of various sizes in the lists of central cache 310. For example, the heap manager may keep free list 312, which may identify free blocks of a given size (e.g., 4-bytes) on a given node (e.g., node 1). In addition, the heap manager may keep free list 314, which may identify free blocks of a different given size (e.g., 8-bytes) on the given node. In various embodiments, NUMA-aware heap manager 300 may keep any number of free lists, each corresponding to free memory blocks of a different size on a given node. For example, in one embodiment, each of 256 predefined object sizes from 8-bytes to 32 KB may be kept by the heap manager. As in the illustrated embodiment, the set of free lists 312-316 may be replicated for each node in the system. For example, free lists 322-326 may correspond to node 2, while free lists 332-336 may correspond to another node N.

In such embodiments, the central cache such as those that utilize a central cache may be associated with a synchronization lock and/or other concurrency control mechanism. In alternate embodiments, the central cache may be associated with several synchronization mechanisms. For example, the free block lists corresponding to a given node may be associated with a given lock, which may be different than the lock with which free block lists corresponding to a different node are associated. Such a configuration may reduce lock contention during execution.

The next level of cache in the illustrated embodiment of FIG. 3a, is page heap 340. In some embodiments, page heap 340 may be used to track large memory blocks (i.e., page spans) allocated via the operating system, as in 230 of FIG. 2. As in central cache 310, the heap manager may keep a separate list of free page spans for each node (e.g., free page spans lists 344-348). In such embodiments, each such list may track free page spans on the associated node. For example, in the illustrated embodiment of FIG. 3a, free page spans list 344 is used by the heap manager to track free page spans on node 1 while free page spans list 346 is used to track free page spans on node 2, etc. In various embodiments, each memory block in page heap 340 may be tracked by the heap manager according to the memory block's size, as in central cache 310.

In some embodiments, wherein virtual memory is used, the heap manager may retain a returned free page spans list, such as 342, as part of page heap 340. Returned free page spans list 342 may be used to track virtual memory page spans whose corresponding physical memory has been returned to the operating system. In some embodiments, free page spans list 342 may not be duplicated for each node, since it may contain virtual memory addresses with no underlying physical memory space, which do not belong to any node.

Figure 4:
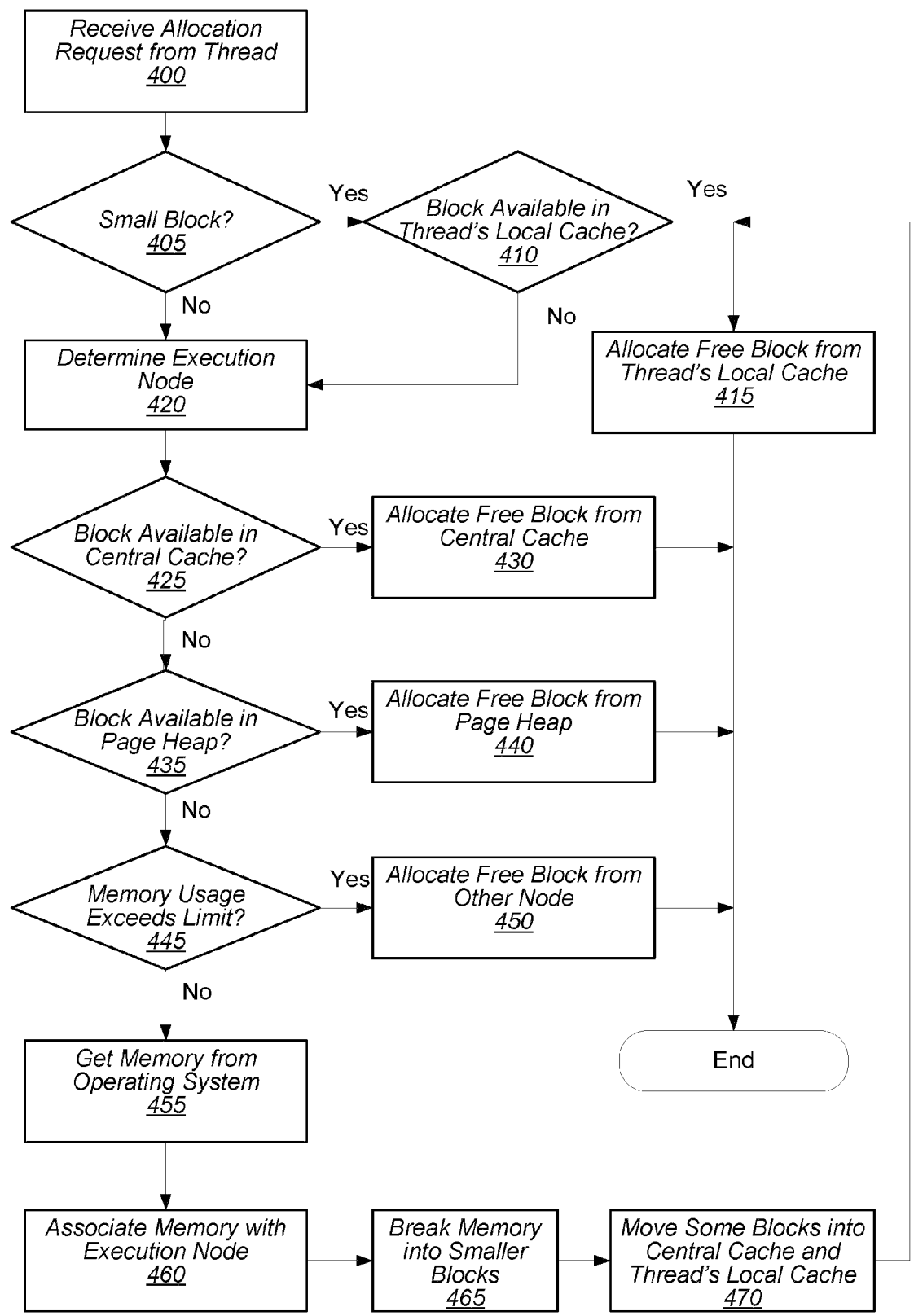
FIG. 4 is a flowchart illustrating a method for a NUMA-aware heap memory manager allocating a block of memory to a thread, according to one embodiment.

FIG. 4 is a flowchart illustrating a method for allocating a memory block to a thread using a NUMA-aware heap memory management architecture, such as 300, according to one embodiment. The illustrated method begins when the heap manager receives an allocation request from a thread, as in 400. In some embodiments, the heap manager may determine if the request is for an allocation of a "small" block, for example, 32 KB or less, as in 405. In various embodiments, other block-size thresholds may be used.

If the block is small, as indicated by the affirmative exit from 405, the heap manager may determine if a block of the requested size is available in the local thread cache corresponding to the requesting thread, as in 410. If a properly sized block is available, as indicated by the affirmative exit from 410, the heap manager may allocate the block to the thread, as in 415. Memory on a thread's local cache may be assumed to be on the same NUMA node as the thread.

If a the requested allocation is not small (as indicated by the negative exit from 405) or no satisfactory block is available in the local thread cache (as indicated by the negative exit from 410) then the heap manager may determine the node on which the thread is executing, as in 420. In other embodiments, if the requested allocation is not small, the heap manager may go directly to the page heap to locate an appropriate block, bypassing the thread's local cache and the central cache.

In the illustrated embodiment, once the heap manager determines the execution node, as in 420, it may determine if an appropriately sized block is available in the central cache, as in 425. In some embodiments, the heap manager may attempt to locate a block of the given size and that is on the execution node. In various embodiments, this may include checking a free list, such as 312 in FIG. 3a, wherein the free list is associated with the execution node determined in 420. In embodiments wherein the heap manager keeps a separate free list for each block size, the heap manager may check the free list corresponding to the requested block size and determined execution node.

If an appropriate block is available in the central cache, as indicated by the affirmative exit from 425, then the heap manager may allocate it to the thread, as in 430. In some embodiments, in stage 430, the heap manager may only allocate a block that is on the execution node. Doing this may increase the locality of memory accesses made by the thread.

In the illustrated embodiment, if an appropriate block of memory is not available in the central cache, as indicated by the negative exit from 425, then the heap manager may search for an appropriate block in the page heap, as in 435. As in the central cache, in some embodiments, the heap manager may attempt to locate a block of the given size and that is on the execution node. Doing so may increase the locality of memory accesses made by the thread.

According to the illustrated embodiment, if an appropriate block is found in the page heap, as indicated by the affirmative exit from 435, then the heap manager may allocate such a block to the thread, as in 440. Again, in some embodiments, the heap manager may only allocate a block that is on the execution node in stage 440.

If the heap manager cannot locate an appropriate memory block in the page heap, as indicated by the negative exit from 435, then it may need to request more memory from the operating system. However, in some embodiments, allocating more memory from the operating system may be contingent on one or more memory usage thresholds. For example, in one embodiment, an application may not be allocated more than a given amount of memory. In other embodiments, the amount of memory that an application and/or a thread of an application may be allocated from a given node may be limited. In such cases, it may be undesirable and/or impossible for the heap manager to request more memory (e.g., page spans) from the operating system.

In stage 445 of the illustrated embodiment, the heap manager may determine if the application's memory usage has surpassed a given maximum threshold. As discussed above, in various embodiments, the heap manager may use any combination of memory usage statistics, thresholds, and/or other heuristics to determine if it may request more memory from the operating system. In some embodiments, the total amount of memory that an application and/or thread of an application can be allocated may be configurable. In the illustrated embodiment, if the heap manager determines that it may request more memory from the operating system, as indicated by the negative exit from 445, then it may make such a request, as in 455.

In some embodiments, the heap manager's request to the operating system for allocation may include an indication of the node from which the memory chunk should be allocated. In such embodiments, the heap manager may indicate that this node be the execution node. In some embodiments, the heap manager may specify the node from which the operating system should allocate the memory chunk through an operating system API, as provided by Linux (i.e., libnuma function mbind) and Windows Vista™ (function VirtualAllocExNuma). In some embodiments, the operating system may not allow the heap manager to explicitly request that a memory chunk be allocated from a given node (e.g., in Windows XP™). In such embodiments, the heap manager may rely on a first-touch policy of the operating system and simply assume that a chunk of memory allocated by the operating system will be allocated on the execution node.

As described earlier, in embodiments, a heap manager may request a chuck of memory from the operating system that is much larger than the block of memory requested by the thread in 400. The heap manager may break up such a chunk into several smaller blocks, as in 465. By doing so, the heap manger may avoid having to request memory from the operating system again during subsequent allocation requests.

In some embodiments, once the memory chunk has been decomposed into smaller blocks, as in 465, the heap manager may populate one or more other levels of the memory allocation cache, as in 470. The other levels of memory allocation cache may include the central cache and/or the local thread cache. For example, the heap manager may modify one or more lists associated with the execution node in the central cache such that they identify one or more of the newly acquired memory blocks. Likewise, the heap manager may modify the requesting thread's local thread cache to identify one or more of the newly acquired blocks.

In the illustrated embodiment, the heap manager may add a block of the requested size to the requesting thread's local cache and then allocate the block from the thread's local cache, as in 415. In other embodiments, the heap manager may allocate the new block directly to the thread without first placing it in the local thread cache.

In some embodiments, if the heap manager determines that it should not ask the operating system to allocate more memory, for example because a memory usage limit has been exceeded by the application (as indicated by the affirmative exit from 445), then it may attempt to allocate a memory block to the thread from a node other than the execution node (i.e., a remote node), as in 450. The heap manager may accomplish this, for example, by searching the central cache for an appropriate block that is on a node other than the execution node. Doing so may comprise checking a free list associated with a node in the central cache that is not the execution node. In some embodiments, if the heap manager cannot find an appropriate free block in the central cache, then it may search the page heap. Again, the heap manager may search a free page spans list that is associated with a node other than the execution node. In some embodiments, the heap manager may determine the other node from which to allocate memory based, at least in part, on the identity of the execution node. For example, an allocation node that is "closer" to the execution node may be preferable than one that is "further" away, in terms of memory access speeds.

Figure 5:
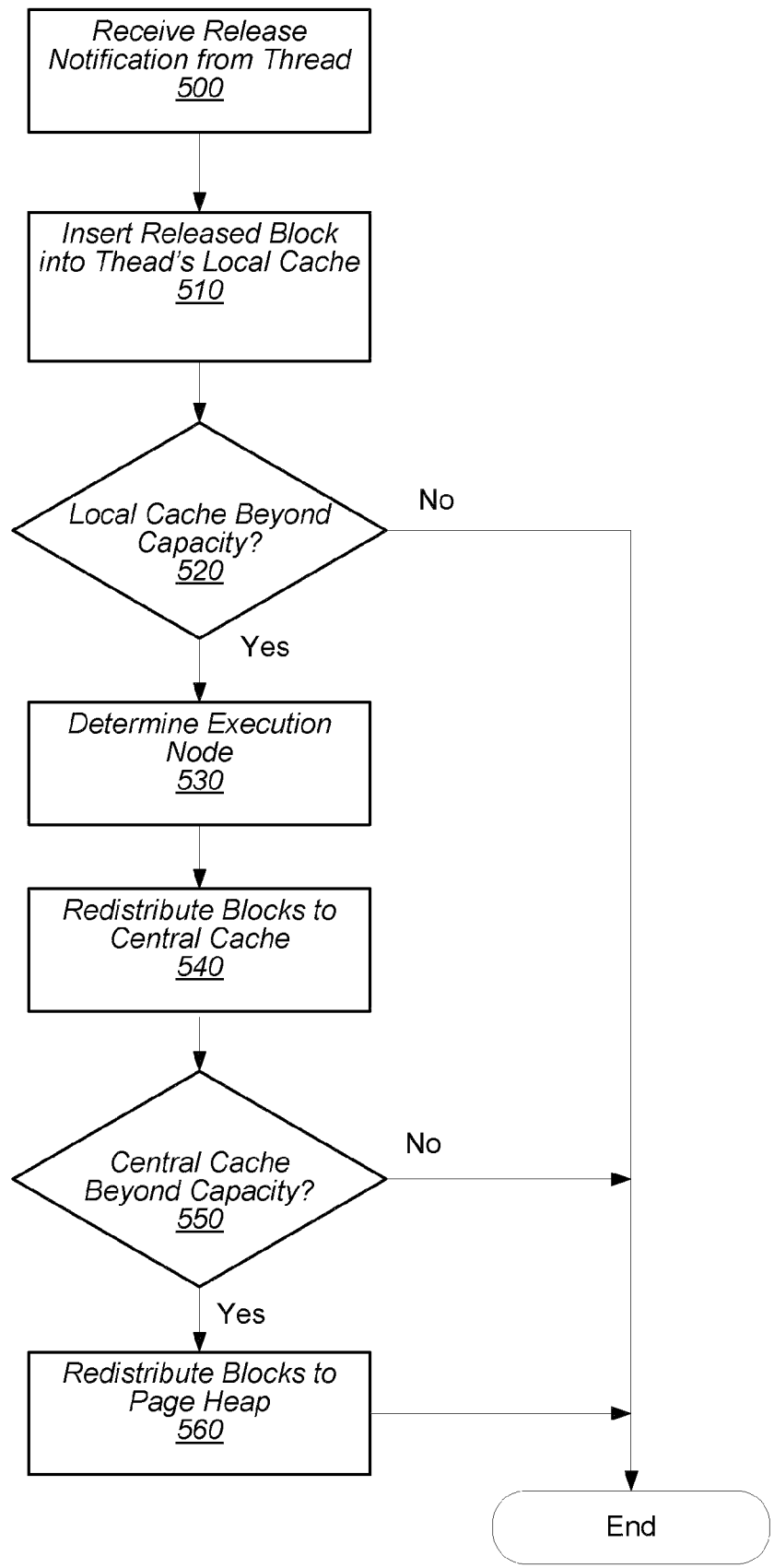
FIG. 5 is a flowchart illustrating a method for a NUMA-aware heap memory manager releasing a block of memory from a thread, according to one embodiment.

FIG. 5 is a flowchart illustrating a method for a thread releasing a block of memory using a NUMA-aware heap manager, according to one embodiment. The illustrated method begins when the heap manager receives a release notification from a thread, as in 500. For example, in C++, this may be a delete( ) function call. The release notification may include an indication of the memory block to be de-allocated.

In response to receiving such a notification, the heap manager may de-allocate the requested block and/or insert it into the thread's local allocation cache, as in 510. This may comprise modifying the thread's local cache to identify the released block. Once in the thread's local cache, the released block may be available to fulfill future allocation requests from the thread.

In some embodiments, the heap manager may assume that the memory block is on the same NUMA node as the releasing thread, for example, by relying on a first touch policy of the operating system. In such a case, the heap manager may attempt to insert the free block into the releasing thread's local cache, as in 510, and/or into other levels of free block cache associated with the NUMA node on which the thread is executing.

For example, in some embodiments, if the local thread cache is full, or exceeds a given capacity, as indicated by the negative exit from 520, then the heap manager may determine the node on which the releasing thread is executing, as in 530.

Once the heap manager determines the execution node, it may redistribute one or more blocks from the thread's local cache to one or more free list of the central cache corresponding to the determined node (e.g., 540). In some embodiments, each redistributed block from the local thread cache may be entered into a free list of the central cache that corresponds to both the determined allocation node and the size of the redistributed block.

In some embodiments, if the redistributed free blocks cause one or more lists in the central cache to surpass a given size, as indicated by the affirmative exit from 550, then the heap manager may perform a similar re-distribution process of moving blocks from the central cache to the page heap, as in 560.

As described above, in some embodiments, the heap manager may assume that the released block is actually located on the execution node of the releasing thread. However, in some embodiments, the block may actually be located on a node other than the one recorded by the heap manager during allocation. For example, suppose a heap manager requests a chunk of memory from an operating system that uses a first touch policy, on behalf of a thread T1 executing on a node N1. In some embodiments, the heap manager may simply assume that the chunk is allocated on N1. However, since the operating system uses a first touch policy, if a different thread T2 executing on node N2, is the first to touch the newly allocated block, then the operating system may map the virtual memory to a physical address on N2. In such a case, the heap manager's assumption that the memory has been allocated on N1 would be wrong and the heap manager may therefore determine the incorrect allocation node during release.

In some embodiments, when a memory block is released, the heap manager may determine the allocation node of the memory block, for example, by querying the operating system. In other embodiments, such as those wherein an allocation querying functionality is not available, the heap manager may determine if the execution node of the releasing thread is the same as the execution node of the thread that originally allocated the memory block. If so, then the heap manager may associate the released block with the thread local cache and/or one or more free lists in other levels of the cache, the free lists corresponding to the execution node. However, if the nodes do not match, then the heap manager may determine a different node with which to associate the released blocks.

Figure 3B:
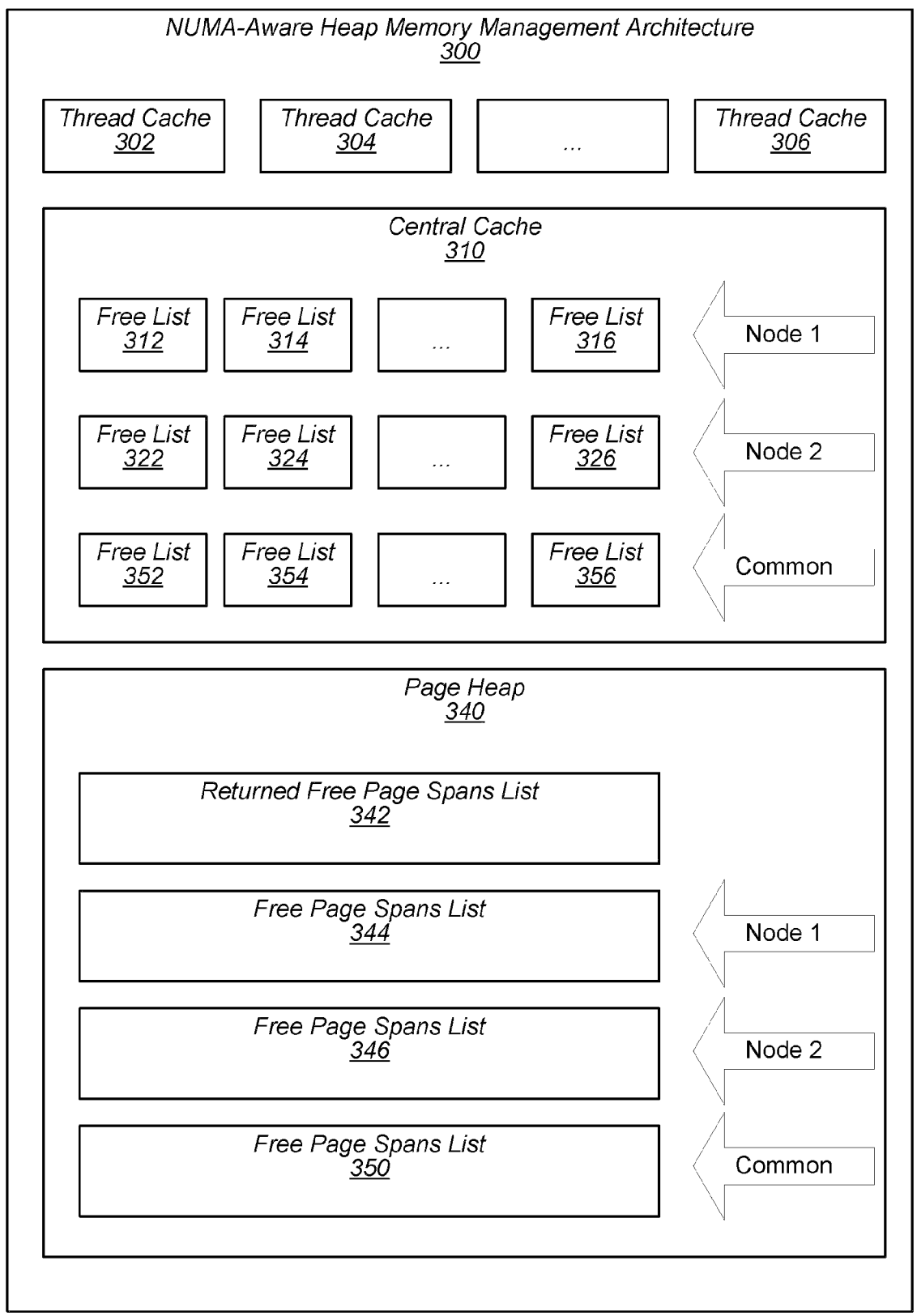
FIG. 3b is a block diagram of a NUMA-aware heap memory management architecture, according to another embodiment.

In some embodiments, such as those where the heap manager may dictate the allocation node to the operating system at allocation time, the heap manager may simply associate the released block with the allocation node the heap manager may have associated with the memory block at allocation time. In other embodiments, where the heap manager cannot specify an allocation node (e.g., operating system using a first touch policy), then the heap manager may associate the released block with a "common node". For instance, in such embodiments, the NUMA-aware heap manager of FIG. 3a may be augmented to include one or more free lists associated with a "common node", for example, as shown in FIG. 3b. In FIG. 3b, elements that correspond to those of FIG. 3a (e.g., 300-346) as discussed above, are numbered identically for simplicity and clarity. In FIG. 3b, free lists 352-356 in central cache 310 are associated with a common node as discussed above. Free page spans list 350, in page heap 340, are also associated with the common node. In various embodiments, such free lists associated with a common node may exist in the central cache and/or in the page heap. Common node free lists may be associated with memory blocks for which the heap manager cannot determine the allocation node. For example, phase 530 may comprise checking if the execution node of the releasing thread matches the allocation node associated with the block by the heap manager. If so, then the heap manager may determine that the associated allocation node is correct. Otherwise, it may determine that the associated allocation node is incorrect.

Figure 6:
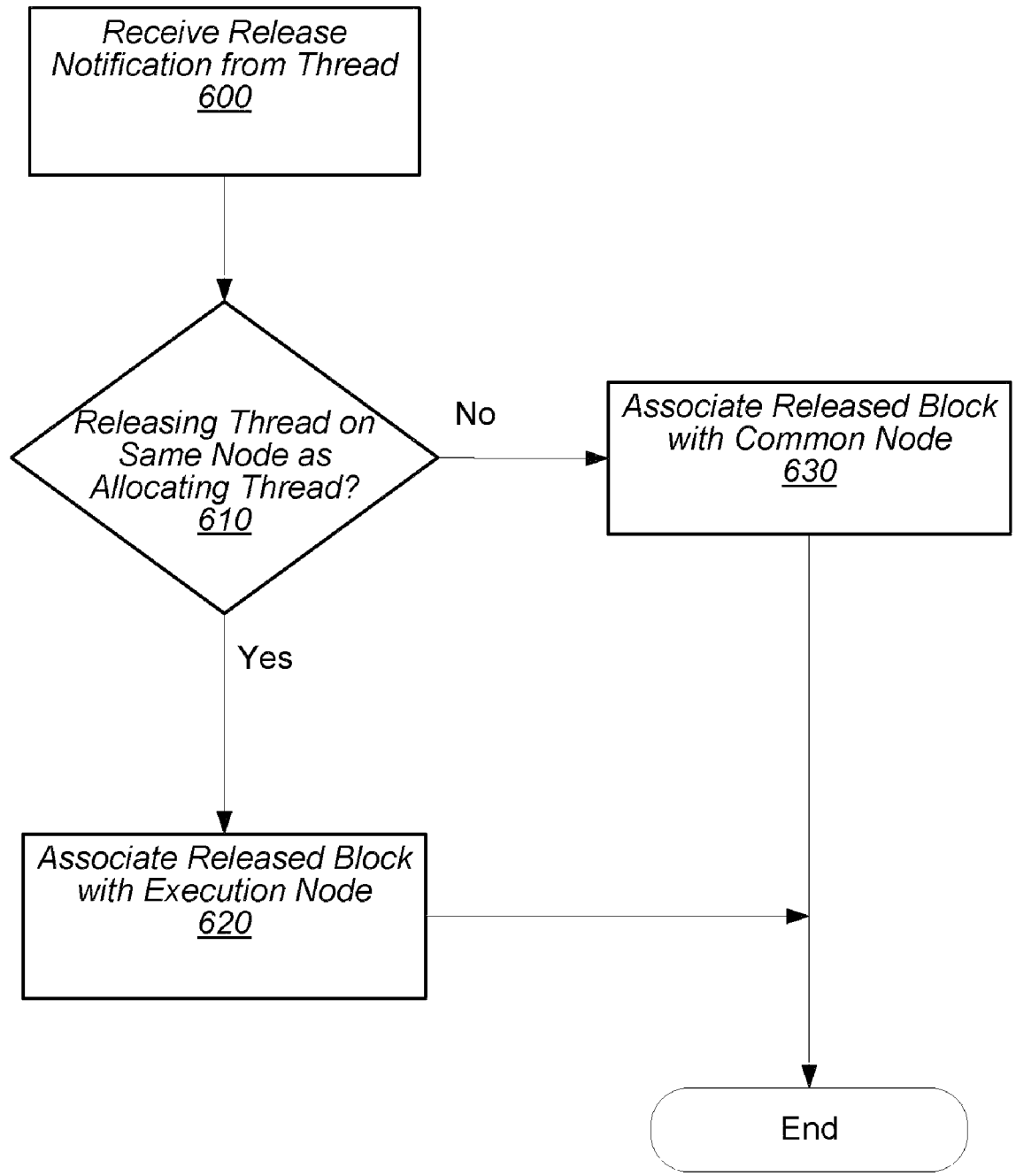
FIG. 6 is a flowchart illustrating a method for a NUMA-aware heap memory manager releasing a block of memory from a thread using a common node mechanism as described herein, according to one embodiment.

FIG. 6 is a flowchart illustrating a method for a heap manager releasing a memory block using a common node scheme, according to one embodiment. The illustrated method begins when the heap manager receives a notification of thread release, as in 600. The heap manager may then determine if the execution node of the releasing thread matches the allocation node that the heap manager has associated with the block during allocation. If so, as indicated by the affirmative exit from 610, then the heap manager may associate the released block with the execution node, as in 620. Otherwise, as indicated by the negative exit from 610, the heap manager may associate the released block with the common node, as in 630.

In some embodiments, associating the released block with the execution node (as in 620) may be performed using a method similar to that of FIG. 5, starting at 510. In some embodiments, associating the released block with the common node (as in 630) may be performed using a method similar to that of FIG. 5, starting at 540. In some embodiments, associating the released block with the common node may comprise associating the entire memory page containing the released block with the common node.

In embodiments wherein a common node is used, during allocation, a free block may be allocated from the common node to a requesting thread, for instance, in 450 of FIG. 4. In such embodiments, if the heap manager determines that it should not allocate more memory from the operating system (e.g., affirmative exit from 445), then the heap manager may attempt to satisfy the allocation request by allocating a free block of the requested size from the common node, as in 450.

In some embodiments, a heap manager may aggressively attempt to return memory blocks associated with the common node to the operating system (i.e., reclaiming memory). For example, as soon as a page span belonging to a common node can be reclaimed, the underlying physical memory may be released back to the operating system and the page span may be moved to a returned free page span list, such as 342 of FIG. 3a. By doing this, the heap manager may allow the underlying physical memory to be reallocated more quickly to a local thread.

Figure 7:
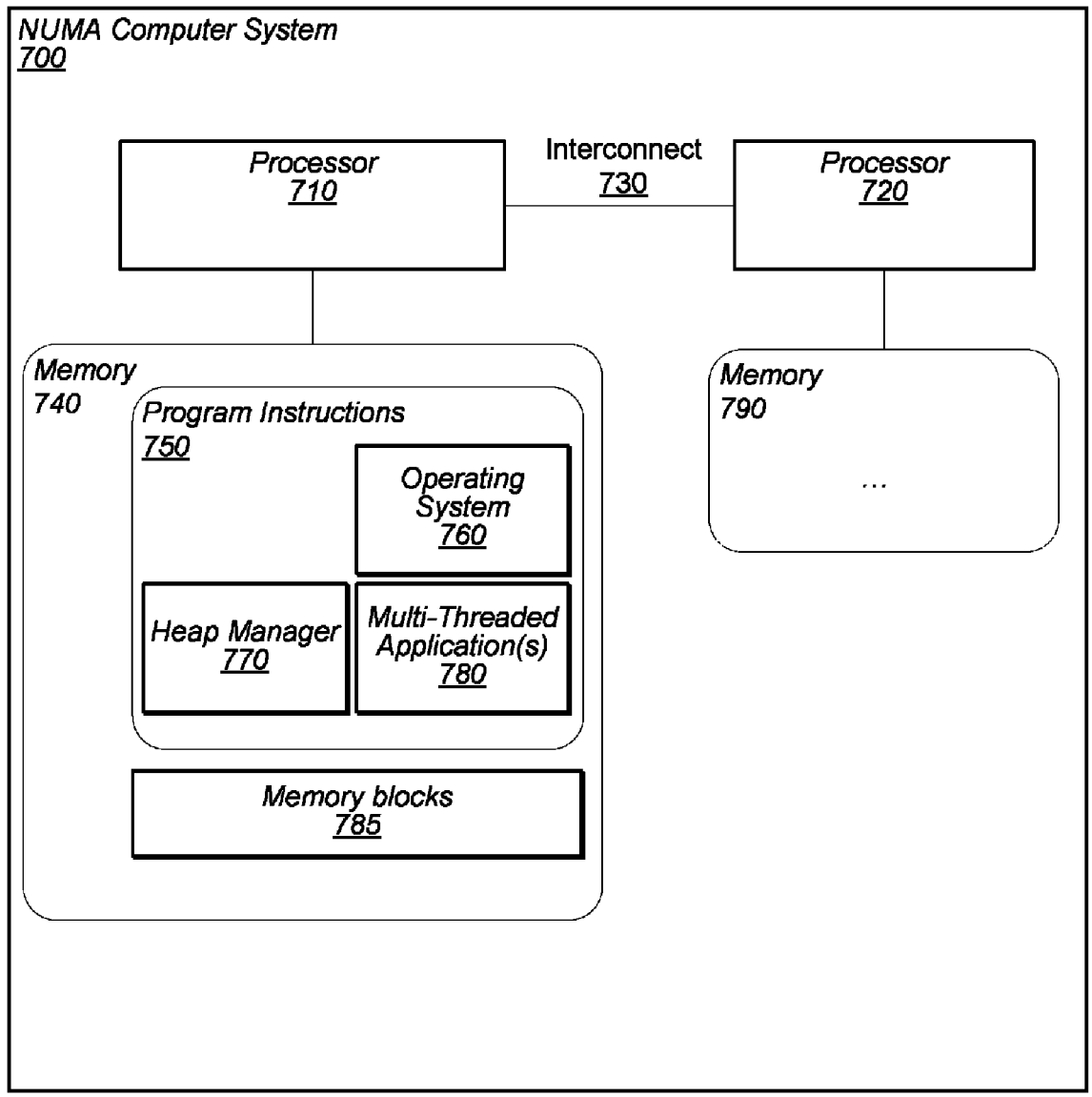
FIG. 7 is a block diagram of a NUMA computer system configured to implement a NUMA-aware heap memory manager as described herein, according to one embodiment.

FIG. 7 illustrates a NUMA computing system configured to implement the methods described herein, according to various embodiments. The computer system 700 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

The NUMA-aware heap management mechanisms described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

A NUMA computer system 700 may include two or more processors (e.g., 710 and 720), each of which may include multiple cores, any of which may be single or multi-threaded. Each processor (e.g., 710) may be coupled to at least one other processor (e.g., 720) with an interconnect 730, which may comprise a direct link, such as a HyperTransport™ bus. Each processor (e.g., 710, 720) in the NUMA computer system 700 may be coupled to one or more respective local memories (e.g., 740, 790). In various embodiments, these memories may comprise one or more of cache, SRAM, DRAM, RDRAM, EDO RAM, DDR 10 RAM, SDRAM, Rambus RAM, EEPROM, and the like. Each processor 710 and 720 may directly access its own memory (740 and 790 respectively) and/or access the memory of the other processors (i.e., remote memory) indirectly over interconnect 730. Latency and/or bandwidth to and/or from local memory may be faster than latency and/or bandwidth to and/or from remote memories. For example, processor 710 may be able to access memory 740 more quickly than it may access memory 790.

One or more of the system memories 740/790 may contain program instructions 750. Program instructions 750 may comprise program instructions executable to implement one or more multi-threaded applications 780, each comprising one or more threads of execution. Program instructions 750 may further comprise one or more operating systems 760, such as Linux and/or Microsoft Windows Vista™. In various embodiments, operating system 760 may support virtual memory and/or a first touch allocation policy. In some embodiments, operating system 760 may provide an API that allows a heap manager to designate the physical node on which a chunk of memory should be allocated. Program instructions 750 may comprise software components and/or mechanisms configured to provide functions, operations and/or other processes for implementing program instructions executable to implement a NUMA-aware heap memory manager 770, as described herein.

In various embodiments, program instructions executable to implement all or part of operating system 760, heap manager 770, and/or multi-threaded applications 780 may be replicated and/or distributed across the numerous memories, such as 740 and 790. Program instructions 750 and/or program instructions on other memories (not pictured), may be encoded in platform native binary, any interpreted language such as Java™ byte-code, or in any other language such as C/C++, Java™, etc. or in any combination thereof.

Memories 740 and/or 790 may comprise memory blocks, such as 785. Memory blocks 785 may be allocated by operating system 760 to heap manager 770 upon request, as described herein. Operating system 760 may also map the physical addresses of memory blocks 785 to virtual memory addresses, as described herein.

Various embodiments may include fewer or additional components not illustrated in FIG. 7, such as video cards, audio cards, additional network interfaces, peripheral devices, a network interface such as an ATM interface, an Ethernet interface, a Frame Relay interface, and/or persistent storage devices such as optical storage, magnetic storage, hard drive, tape drive, solid state memory, and the like.

Although the embodiments above have been described in considerable detail, numerous variations and modifications will become apparent to those skilled in the art once the above disclosure is fully appreciated. For example, as faster and/or more powerful tools emerge for controlling and/or tracking memory allocations, numerous other implementation variations will become apparent for allocating memory using a heap manager in such a way as to minimize remote memory accesses among threads. It is intended that the following claims be interpreted to embrace all such variations and modifications.

What is claimed:

1. A computer-implemented method, comprising:
a heap manager maintaining a plurality of thread caches, wherein each respective thread cache corresponds to a respective thread of a plurality of threads executing on a Non-Uniform Memory Access (NUMA) computer system and identifies one or more free memory blocks reserved for the respective thread;
the heap manager receiving a first memory allocation request from a particular thread of the plurality of threads, the request comprising a first block size;
in response to the first memory allocation request, the heap manager determining that a first thread cache of the plurality of thread caches corresponds to the particular thread;
the heap manager locating from the one or more free memory blocks reserved for the particular thread identified by the first thread cache a first block of memory of the first block size, wherein the particular thread executes on a particular execution node of the NUMA computer system, wherein the one or more free memory blocks reserved for the particular thread identified by the first thread cache are local to the particular execution node; and the heap manager allocating the first block of memory to the particular thread.

2. The method of claim 1, further comprising:

the heap manager receiving a second memory allocation request from the particular thread;

in response to the second memory allocation request, the heap manager determining an allocation node of the NUMA computer system other than the execution node on which the particular thread executes based, at least in part, on a degree of locality between the allocation node and the execution node, and further based, at least in part, on a determination that the memory on the allocation node is more local to the execution node than is memory on another node of the NUMA computer system; and the heap manager allocating a second block of memory on the allocation node to the particular thread.

3. The method of claim 1, further comprising:

the heap manager receiving a second memory allocation request from the particular thread;

after determining that the first thread cache corresponding to the particular thread does not identify a free memory block to satisfy the second memory allocation request, the heap manager determining that memory should be allocated on the execution node on which the particular thread executes from an operating system executing on the NUMA computer system;

the heap manager sending a request to the operating system for allocating a chunk of memory on the execution node on which the particular thread executes, wherein the operating system allocates the chunk of memory to the heap manager;

the heap manager breaking the chunk of memory allocated from the operating system into smaller memory blocks; and the heap manager allocating one or more of the smaller memory blocks to the particular thread.

4. The method of claim 3, wherein said determining that memory should be allocated on the execution node from the operating system comprises determining that an amount of memory already allocated on the execution node from the operating system does not exceed a threshold amount.

5. The method of claim 1, further comprising:

the heap manager receiving an indication that the particular thread has released the first block of memory; and in response to the indication, the heap manager de-allocating the first block of memory from the particular thread and adding the first block of memory to the first thread cache corresponding to the particular thread.

6. The method of claim 1 further comprising:

the heap manager receiving an indication that the particular thread has released a second block of memory of a particular node of the NUMA computer system;

in response to said receiving the indication, the heap manager determining that the particular thread is not executing on the particular node; and in response to said determining the particular thread is not executing on the particular node, the heap manager associating the second block of memory with a listing of free blocks not associated with any node of the NUMA computer system.

7. The method of claim 1, further comprising:

the heap manager maintaining a plurality of free lists, wherein each respective free list corresponds to a respective node of the NUMA computer system and identifies one or more free blocks of memory of the respective node;

the heap manager receiving a second memory allocation request from the particular thread, the second memory allocation request comprising a second block size;

in response to determining that the first thread cache corresponding to the particular thread does not identify a free memory block to satisfy the second memory allocation request, the heap manager locating from a first free list of the plurality of free lists a second block of memory of the second block size, wherein the first free list corresponds to the execution node on which the particular thread executes; and the heap manager allocating the second block of memory to the particular thread.

8. A computer-readable storage medium storing program instructions executable by one or more processors in a Non-Uniform Memory Access (NUMA) computer system to implement:

a heap manager maintaining a plurality of thread caches, wherein each respective thread cache corresponds to a respective thread of a plurality of threads executing on the NUMA computer system and identifies one or more free memory blocks reserved for the respective thread;

the heap manager receiving a first memory allocation request from a particular thread of the plurality of threads, the request comprising a first block size;

in response to the first memory allocation request, the heap manager determining that a first thread cache of the plurality of thread caches corresponds to the particular thread;

the heap manager locating from the one or more free memory blocks reserved for the particular thread identified by the first thread cache a first block of memory of the first block size, wherein the particular thread executes on a particular execution node of the NUMA computer system, wherein the one or more free memory blocks reserved for the particular thread identified by the first thread cache are local to the particular execution node; and the heap manager allocating the first block of memory to the particular thread.

9. The storage medium of claim 8, wherein the program instructions are further executable by the one or more processors to implement:

the heap manager receiving a second memory allocation request from the particular thread;

in response to the second memory allocation request, the heap manager determining an allocation node of the NUMA computer system other than the execution node on which the particular thread executes based, at least in part, on a degree of locality between the allocation node and the execution node, and further based, at least in part, on a determination that the memory on the allocation node is more local to the execution node than is memory on another node of the NUMA computer system; and the heap manager allocating a second block of memory on the allocation node to the particular thread.

10. The storage medium of claim 8, wherein the program instructions are further executable by the one or more processors to implement:

the heap manager receiving a second memory allocation request from the particular thread;

after determining that the first thread cache corresponding to the particular thread does not identify a free memory block to satisfy the second memory allocation request, the heap manager determining that memory should be allocated on the execution node on which the particular thread executes from an operating system executing on the NUMA computer system;

the heap manager sending a request to the operating system for allocating a chunk of memory on the execution node on which the particular thread executes, wherein the operating system allocates the chunk of memory to the heap manager;

the heap manager breaking the chunk of memory allocated from the operating system into smaller memory blocks; and the heap manager allocating one or more of the smaller memory blocks to the particular thread.

11. The storage medium of claim 10, wherein said determining that memory should be allocated on the execution node from the operating system comprises determining that an amount of memory already allocated on the execution node from the operating system does not exceed a threshold amount.

12. The storage medium of claim 8, wherein the program instructions are further executable by the one or more processors to implement:

the heap manager receiving an indication that the particular thread has released the first block of memory; and in response to the indication, the heap manager de-allocating the first block of memory from the particular thread and adding the first block of memory to the first thread cache corresponding to the particular thread.

13. The storage medium of claim 8, wherein the program instructions are further executable by the one or more processors to implement:

the heap manager receiving an indication that the particular thread has released a second block of memory of a particular node of the NUMA computer system;

in response to said receiving the indication, the heap manager determining that the particular thread is not executing on the particular node; and in response to said determining the particular thread is not executing on the particular node, the heap manager associating the second block of memory with a listing of free blocks not associated with any node of the NUMA computer system.

14. A Non-Uniform Memory Access (NUMA) computer system comprising:

two or more nodes, each node comprising a processor and a memory coupled to the processor;

the memories of one or more nodes storing program instructions executable by the two or more processors to implement:

a heap manager maintaining a plurality of thread caches, wherein each respective thread cache corresponds to a respective thread of a plurality of threads and identifies one or more free memory blocks reserved for the respective thread;

the heap manager receiving a first memory allocation request from a particular thread of the plurality of threads, the request comprising a first block size;

in response to the first memory allocation request, the heap manager determining that a first thread cache of the plurality of thread caches corresponds to the particular thread;

the heap manager locating from the one or more free memory blocks reserved for the particular thread identified by the first thread cache a first block of memory of the first block size, wherein the particular thread executes on a particular execution node of the two or more nodes, wherein the one or more free memory blocks reserved for the particular thread identified by the first thread cache are local to the particular execution node; and the heap manager allocating the first block of memory to the particular thread.

15. The system of claim 14, wherein the program instructions are further executable by the two or more processors to implement:

the heap manager receiving a second memory allocation request from the particular thread;

in response to the second memory allocation request, the heap manager determining an allocation node of the NUMA computer system other than the execution node on which the particular thread executes based, at least in part, on a degree of locality between the allocation node and the execution node, and further based, at least in part, on a determination that the memory on the allocation node is more local to the execution node than is memory on another node of the NUMA computer system; and the heap manager allocating a second block of memory on the allocation node to the particular thread.

16. The system of claim 14, wherein the program instructions are further executable by the two or more processors to implement:

the heap manager receiving a second memory allocation request from the particular thread;

after determining that the first thread cache corresponding to the particular thread does not identify a free memory block to satisfy the second memory allocation request, the heap manager determining that memory should be allocated on the execution node on which the particular thread executes from an operating system executing on the NUMA computer system;

the heap manager sending a request to the operating system for allocating a chunk of memory on the execution node on which the particular thread executes, wherein the operating system allocates the chunk of memory to the heap manager;

the heap manager breaking the chunk of memory allocated from the operating system into smaller memory blocks; and the heap manager allocating one or more of the smaller memory blocks to the particular thread.

17. The system of claim 16, wherein said determining that memory should be allocated on the execution node from the operating system comprises determining that an amount of memory already allocated on the execution node from the operating system does not exceed a threshold amount.

18. The system of claim 14, wherein the program instructions are further executable by the two or more processors to implement:

the heap manager receiving an indication that the particular thread has released the first block of memory; and in response to the indication, the heap manager de-allocating the first block of memory from the particular thread and adding the first block of memory to the first thread cache corresponding to the particular thread.

19. The system of claim 14, wherein the program instructions are further executable by the two or more processors to implement:

the heap manager receiving an indication that the particular thread has released a second block of memory of a particular node of the NUMA computer system;

in response to said receiving the indication, the heap manager determining that the particular thread is not executing on the particular node; and in response to said determining the particular thread is not executing on the particular node, the heap manager associating the second block of memory with a listing of free blocks not associated with any node of the NUMA computer system.

* * * * *